United States Patent

[11] 3,597,003

[72] Inventor Alex Kraus
1650 West Rosecrans Ave., Gardena, Calif. 90249
[21] Appl. No. 820,860
[22] Filed May 1, 1969
[45] Patented Aug. 3, 1971

[54] SPINNER HUB CAP
4 Claims, 3 Drawing Figs.

[52] U.S. Cl. .................................................. 301/108 S, D14/30
[51] Int. Cl. ...................................................... B60b 7/04
[50] Field of Search ............................................ 301/37, 108; D14/30.1

[56] References Cited
UNITED STATES PATENTS
2,590,363 3/1952 Adair ............................ 301/9 (DN)
3,329,468 7/1967 Beith ............................ 301/65
3,346,304 10/1967 Fenton ......................... 301/108 (S)

OTHER REFERENCES
Motor Trend page 16, Dec. 1962 Item Entitled "Traction-Master Nokofs"
Whitney & Co. Catalog No. 256, page 79 received 7-3-68 Item No. 15-1961

Primary Examiner—Richard J. Johnson
Attorney—Robert Thompson

ABSTRACT: A spinner hub cap having a substantially frustoconical hollow cover member adapted to receive the hub of an automobile wheel, the screws extending through apertured ears on the cover for fastening a flange to the base of the cover wherein the flange includes a plurality of equally angularly spaced lug bolt receiving apertures, the apertures being defined by two contiguous overlapping circles, each of a different diameter and having a different center located on the same radian extending from an axis of rotation of the spinner hub cap.

PATENTED AUG 3 1971 3,597,003

INVENTOR.
ALEX KRAUS,
BY
Robert Thompson
ATTORNEY.

3,597,003

SPINNER HUB CAP

BACKGROUND OF THE INVENTION

This invention relates generally to an improved automobile hub cap that can be secured to a plurality of different automobile types.

The typical United States automobile has five lug bolts secured to extend laterally outward from the brake drum housing of each wheel. Although substantially all automobiles have the same number of lug bolts which are angularly displaced equally throughout 360, the diameters of the lug bolts and their radial displacement relative to the axis of rotation of the wheel can vary from manufacturer to manufacturer.

Heretofore, techniques have been used to make generally adaptable wheels for different manufacturers product. One technique that has been used has been to form five equally spaced elongate recesses in the wheel that are adapted to receive five inserts each having apertures of a selected diameter and located at a selected position therein for each manufacturers type of automobile. This technique required a multiplicity of parts, complex manufacturing techniques and was not especially adaptable to other thin metal devices such as spinner hubcaps.

SUMMARY OF THE INVENTION

Accordingly, it is an object of this invention to provide improvements in a spinner hubcap which is generally adaptable to fit different manufacturers automobiles.

Another object is to provide a new ornamental design for a spinner hubcap.

The above and other objectives of this invention can be attained with the provision of a spinner hubcap having a hollow cover member with a flange secured to the base thereof. The flange has a plurality of equally angularly spaced apertures formed therein, wherein the shape of the apertures is defined by a plurality of contiguous overlapping circles each having different diameters with different centers located along the same radian extending from the axis of the hubcap.

Advantages of this arrangement are: that the single spinner hubcap will fit a plurality of different manufacturers automobiles having lug bolts of different diameters located at different radial distances from the axis of rotation of the wheel; there is a saving in parts inventory because of the standardization; there is a low manufacturing cost; and the spinner hubcap is automatically centered and held thereat on the different wheel types.

BRIEF DESCRIPTION OF THE DRAWING

Other objects, features and advantages of this invention will become apparent upon reading the following detailed description of several embodiments of the invention and referring to the accompanying drawings wherein.

DETAILED DESCRIPTION OF A PREFERRED EMBODIMENT

Figure 1:
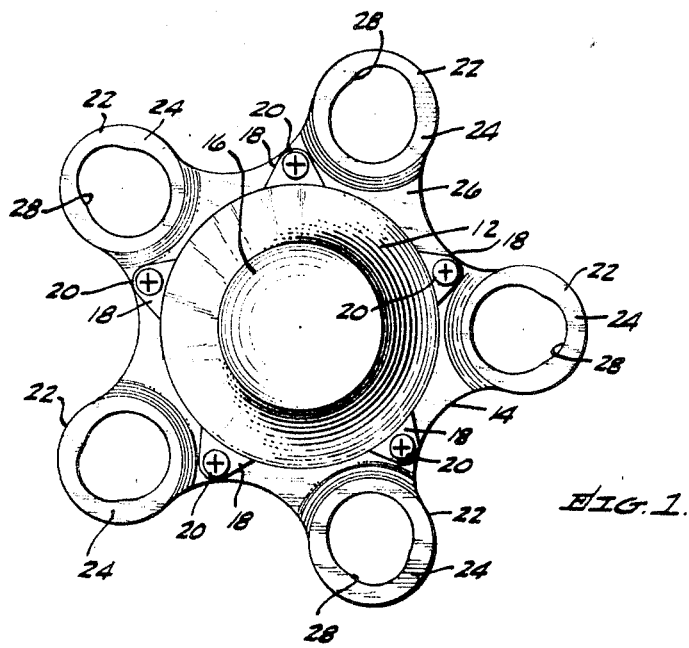
FIG. 1 is a front end view of the spinner hubcap illustrating the generally adaptable apertured flange feature.
Figure 2:
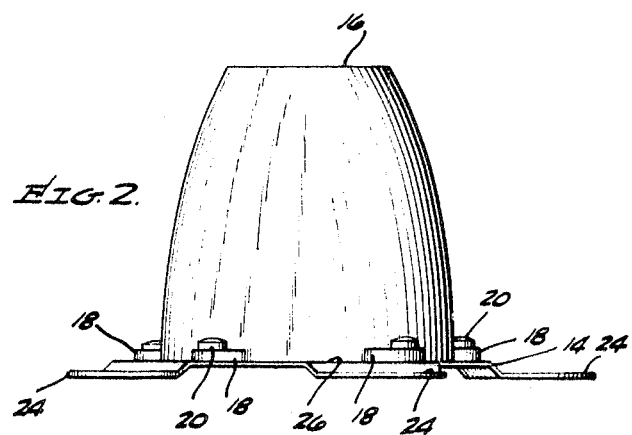
FIG. 2 is a side view of the spinner hubcap illustrating the substantially frustoconical hollow cover secured to the apertured flange.
Figure 3:
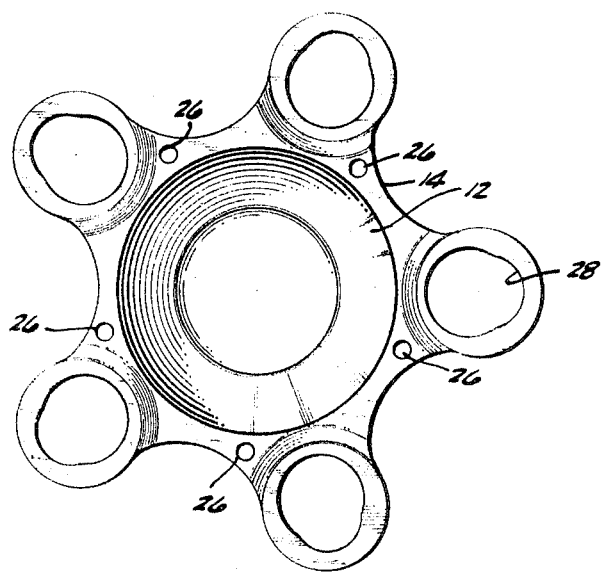
FIG. 3 is a rear end view of the spinner hubcap illustrating the generally adaptable apertured flange.

Referring now to the drawings in more detail, FIGS. 1, 2 and 3 illustrate a spinner hub cap having a hollow cover 12 that is fastened to a multiapertured flange 14 by means of a plurality of mechanical fasteners.

More specifically, the hollow cover 12 is a substantially frustoconical shape having a slightly concave top portion 16. The cavity formed within the hollow cover 12 has a large enough diameter and depth to hold the grease cap or hub of those types of automobiles or motor vehicles to which the spinner hubcap is to be attached. The peripheral outer edge of the hollow cover 14 at the base thereof has a plurality of equally angularly spaced apertured ears 18 formed to project radially outward therefrom. Each apertured ear 18 receive a fastener 20 such as a self-tapping metal screw for securing the hollow cover 12 to the flange 14. It should, of course, be understood that other types of fasteners could be used in place of the metal screws 20.

The flange 14 is preferably made from thin metal plate and is stamped or otherwise formed with a plurality of equally-spaced, radially extending ears 22. These ears 22 each include a flat area 24 depressed slightly below the plane of a table portion 26 of the flange 14 as illustrated in FIG. 2. The table portion 26 of flange 14 has a plurality of fastener receiving apertures 26 formed at locations that are in registry with the apertures in the ears 18 when the hollow cover 12 is properly placed on the flange 14. As a result when the fasteners 20 are inserted through the apertured ears 18, they are threadably tightened in apertures 26 securing flange 14 to the hollow cover 12.

The ears 22 of the flange 14 are each formed with a lug bolt receiving aperture 28. These apertures 28 are equally angularly displaced about the axis of rotation of the spinner hubcap and are five in number. Each aperture 28 has a shape or area defined by the noncommon areas of two contiguous or overlapping circles of different diameters and different centers located at different locations along the same radian extending from the axis of rotation of the hub cap. More specifically, the radially innermost circular portion of the apertures 28 is defined by the circle having the largest diameter with a center more radially inward then the center of the second contiguous circle. The radially outermost circular portion of the apertures 28 is thus best defined by the smaller diameter circle having a center located more radially outward than the center of the larger circle.

As a result of this arrangement of the lug bolt receiving apertures 28, it is possible to fit the same spinner hubcap to several different types of automobiles. For example, the spinner hubcap will fit a first type of automobile with lug bolts of a first diameter displaced radially from the wheel's axis of rotation at a first radial distance. In addition, the spinner hubcap will fit a second type of automobile having lug bolts of a smaller diameter and displaced radially further away from the axis of rotation of the wheel relative to the diameters and radial displacement of the lug bolts of the first type of automobile. With both of these automobiles, the spinner hubcap will be securely held in centered relationship to the axis of rotation of the wheel once the lug nuts are tightened down against the edges of the apertures 28 in the ears 22. In this relationship the lug bolts or lug nuts will preferably contact the entire periphery of the noncommon area of one or the other circle thus automatically centering the spinner hubcap.

While salient features have been illustrated and described with respect to a particular embodiment, it should be readily apparent that modifications can be made within the spirit and scope of the invention and it is therefore not desired to limit the invention to the exact shape and details shown and described.

I claim:

1. A spinner hubcap for a motor vehicle comprising: a hollow cover member having a base portion; a flange member having a plurality of equally angularly displaced apertures formed therethrough, each of said apertures having a periphery defined by the peripheries of the noncommon area portions of an overlapping first circle of a first diameter and second circle of a second diameter wherein the first circle and the second circle each have different centers displaced radially from an axis of rotation of the hubcap a first distance or a second distance respectively; and fastener means for fastening said flange member to said base portion of said hollow cover member in centered relationship relative to their axis of rotation.

2. The spinner hubcap of claim 1 wherein the centers of both circles defining each of said apertures are located at different points on the same radian extending from the axis of rotation of the spinner hubcap.

3. The spinner hubcap of claim 2 in which said hollow cover member is formed with a plurality of radially projecting apertured ears formed at the base portion thereof; and said fastener means include a plurality of metal screws extending through said apertured ears and said flange member for securing said hollow cover member to said flange member.

4. The spinner hubcap of claim 2 in which the smaller diameter circle of the two overlapping circles has center that is located more radially outward than the center of the larger diameter other said circle.